Patented Feb. 22, 1949

2,462,057

UNITED STATES PATENT OFFICE 2,462,057

METHOD OF PRODUCING HEXAETHYL TETRAPHOSPHATE

Howard Adler, Flossmoor, Ill., assignor to Victor Chemical Works, a corporation of Illinois No Drawing. Application February 3, 1947, Serial No. 726,219

4 Claims. (Cl. 260—461)

This invention relates to the production of hexaethyl tetraphosphate.

It has been found that by critically controlling the temperature conditions, phosphoric anhydride and diethyl ether may be reacted to produce a hexaethyl tetraphosphate of high purity. The reaction may be illustrated by the equation:

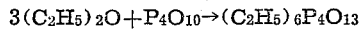

$$3(C_2H_5)_2O + P_4O_{10} \rightarrow (C_2H_5)_6P_4O_{13}$$

It is known that at temperatures below 65° C. metaphosphate esters are produced by reacting diethyl ether and phosphoric anhydride, and that at temperatures from 65° C. to 180° C. orthophosphate esters are produced. It has now been discovered that by narrowly controlling the temperature within the range of approximately 90 to 110° C., the essential reaction is that for producing the tetraphosphate ester. This is within the broad range formerly designated in the prior art for the production of triethyl orthophosphate, but it has been found that at about 90° to 110° C. only insignificant amounts of the orthophosphate ester are produced, whereas at temperatures above 120° C. the orthophosphate ester is the product produced. The essential reaction below 90° C. results in the production of the metaphosphate ester, which is the essential intermediate in the present process.

The reaction must be carried out under pressure in order to prevent the evaporation of the ether which boils at a temperature lower than required for the desired reaction to take place. The necessary pressure may be provided by any suitable means, though generally it is satisfactory to carry out the reaction in a closed autoclave under autogenic pressure.

The proportions of $P_2O_5$ and ether are not highly critical though a minimum proportion of three moles of ether per two moles of $P_2O_5$ are required to satisfy the equation for the reaction. Generally a small excess of ether is employed. Large excess does not materially affect the course of the reaction, but is undesirable from the standpoint of economy in that distillation and recovery of the large excess of ether increases the cost of the process.

In order to avoid too rapid reaction of the $P_2O_5$ and ether with consequent decomposition of part of the intermediate metaphosphate ester formed, the reaction mixture is at first slowly heated during the period of metaphosphate formation at temperatures lower than 90° C. As the heating of the reaction mixture proceeds, the reaction becomes exothermic at a temperature of about 75 to 80° C. Cooling is required at this stage of the reaction to maintain these temperatures and to prevent the temperature from rising too high. After the exothermic stage of the reaction is passed, the mixture is then heated at 90°–110° C. for several hours to produce the hexaethyl tetraphosphate. Usually about 7 to 8 hours are required for optimum formation of the tetraphosphate ester. It is generally impossible to control all of the reaction conditions sufficiently to produce only the tetraphosphate ester. Small amounts of the meta and orthophosphate esters do not affect the general character and uses of the tetraphosphate ester, but it is preferred that the reaction be completed slightly on the metaphosphate or low temperature side for reasons of economy and because such product is of more value for use as an insecticidal agent than an ester containing appreciable amounts of the orthophosphate ester. Under the conditions here employed, the ester product will have a $P_2O_5$ content ranging from about 57% to 60%. This corresponds to hexaethyl tetraphosphate containing from about 7 to 33% of ethyl metaphosphate.

The procedure employed is illustrated in the following typical example:

2580 grams of phosphoric anhydride was placed in a jacketed stainless steel autoclave equipped with an agitator. 2110 grams of substantially anhydrous diethyl ether was added. The autoclave was closed, and while stirring the temperature was raised from 23° C. to 50° C. over a period of one hour. The pressure in the vessel was 20 p. s. i. (gage) maximum. The temperature was then further raised to 75° C. over a period of 2½ hours with the pressure at 56 p. s. i. At this point cold water was run into the jacket of the autoclave to prevent the temperature from increasing too rapidly. When the exothermic reaction slowed down and the reaction temperature dropped to about 50° C., steam was again introduced in the autoclave jacket and the temperature raised to 100° C. and 68 p. s. i. pressure over 3 hours, and held at 100° C. to 108° C. at 54 p. s. i. pressure for a period of 8 hours. At this point the excess ether amounting to about 1.2% by weight of the product was distilled off at 75° C. under vacuum (2 mm. Hg). The clear liquid hexaethyl tetraphosphate ester product had a specific gravity of 1.326 at 25° C., an index of refraction of 1.4302 at 25° C., a viscosity of 194 centipoises at 25° C., and a $P_2O_5$ content of 58.0%.

In another example, 68.5 pounds of phosphoric anhydride and 58.5 pounds of diethyl ether were placed in a 25 gallon stainless steel reactor and heated to 60° C. over a period of one hour, then for 2 hours at 60° C. to 80° C. and 44 p. s. i. pressure. With jacket cooling, the reaction mixture was held for 3 hours at a temperature of 80 to 100° C. and a maximum pressure of 54 p. s. i., and then for 8 hours at 100° C. and 48 p. s. i. pressure. The excess ether was distilled off at 11 mm. Hg pressure at 100° C., leaving a viscous liquid hexaethyl tetraphosphate ester of 60.2% content of $P_2O_5$ and having a specific gravity of 1.357 at 25° C., a viscosity of 211 centipoises at 25° C., and an index of refraction of 1.4332 at 25° C.

Under similar conditions a large number of plant size batches were made giving hexaethyl tetraphosphate products having $P_2O_5$ contents ranging from 57% to 60%, corresponding in composition with the hexaethyl tetraphosphate products now on the market, and produced by more expensive and laborious processes.

Having described my invention as related to the embodiments herein described, it is my intention that the invention be not limited by any of the details of description unless otherwise specified, but rather be construed broadly within its spirit and scope as set out in the accompanying claims.

I claim:

1. The method of producing hexaethyl tetraphosphate which comprises reacting not less than three moles of diethyl ether per two moles of phosphoric anhydride at from about 50° to 90° C. for a sufficient period to effect an intermediate exothermic reaction, cooling to maintain the temperature within said range, and then at the end of the exothermic reaction period heating at from about 90° to 110° C. under superatmospheric pressure for a period of time sufficient to form a substantial proportion of the tetraphosphate.

2. The method of producing hexaethyl tetraphosphate which comprises reacting at least three moles of diethyl ether per two moles of phosphoric anhydride at from about 50° to 90° C. for a sufficient period to effect an intermediate exothermic reaction, cooling to maintain the temperature within said range, and then at the end of the exothermic reaction period heating at from about 90° to 110° C. under superatmospheric pressure for a period of time sufficient to form a hexaethyl tetraphosphate composition having a $P_2O_5$ content of about 57 to 60%.

3. The method of claim 8 wherein the excess ether is distilled off at below 110° C. at the end of the reaction.

4. The method of claim 8 wherein the final heating is carried out at a temperature of about 100° C. for about eight hours.

HOWARD ADLER.

REFERENCES CITED

The following references are of record in the file of this patent:

UNITED STATES PATENTS

| Number | Name | Date |
|---|---|---|
| 2,336,302 | Schrader | Dec. 7, 1943 |
| 2,402,703 | Woodstock | June 25, 1946 |
| 2,407,279 | Hull et al. | Sept. 10, 1946 |

OTHER REFERENCES

Langheld, "Ber. Deut. Chem. Ges.," vol. 44, page 2080 (1911).

Balarew, "Zeit. Anorg. Chem.," vol. 99, page 191 (1917).

Certificate of Correction

Patent No. 2,462,057.

February 22, 1949.

HOWARD ADLER

It is hereby certified that errors appear in the printed specification of the above numbered patent requiring correction as follows:

Column 4, lines 13 and 16, for the claim reference numeral "8" read *2*;

and that the said Letters Patent should be read with these corrections therein that the same may conform to the record of the case in the Patent Office.

Signed and sealed this 23rd day of August, A. D. 1949.

[SEAL]

THOMAS F. MURPHY,
*Assistant Commissioner of Patents.*